United States Patent [19]

Wristers

[11] 4,224,185

[45] Sep. 23, 1980

[54] SHAPING AND SIZING OF CATALYSTS

[75] Inventor: Harry J. Wristers, Baytown, Tex.

[73] Assignee: Exxon Research & Engineering Co., Florham Park, N.J.

[21] Appl. No.: 24,216

[22] Filed: Mar. 26, 1979

Related U.S. Application Data

[63] Continuation of Ser. No. 811,508, Jun. 30, 1977, abandoned.

[51] Int. Cl.$^2$ ............................ C08F 4/64; B01J 31/06
[52] U.S. Cl. ............................... 252/429 B; 252/428; 252/430; 526/144; 526/159
[58] Field of Search ..................... 252/429 B, 430, 428

[56] References Cited

U.S. PATENT DOCUMENTS

| | | | |
|---|---|---|---|
| 3,051,662 | 8/1962 | Pitzer et al. | 252/430 |
| 3,128,252 | 4/1964 | Tornqvist et al. | 252/429 A |
| 3,838,064 | 9/1974 | Vogt et al. | 242/430 X |
| 3,838,092 | 9/1974 | Vogt et al. | 252/428 X |
| 3,990,993 | 11/1976 | Wristers | 252/429 B |
| 3,992,320 | 11/1976 | Schneider et al. | 252/429 B |
| 3,993,584 | 11/1976 | Owen et al. | 106/308 M X |

*Primary Examiner*—Patrick Garvin
*Attorney, Agent, or Firm*—B. C. Cadenhead; M. B. Kurtzman

[57] ABSTRACT

Solid catalyst particles are made into a form and shape that is easier to handle, without changing their surface area or adversely affecting their activity by "matting" the catalyst particles with a fibrillatable polymer by mechanical shearing action and subsequently shaping the "mat", followed by controlled sizing and shaping into the form of pellets, tablets, and the like by known mechanical means. Activity is not impaired, and shaped polymer can be produced in those reactions where the catalyst determines the shape of the product. The practice of this invention is particularly useful to shaped Ziegler-type catalysts.

12 Claims, 1 Drawing Figure

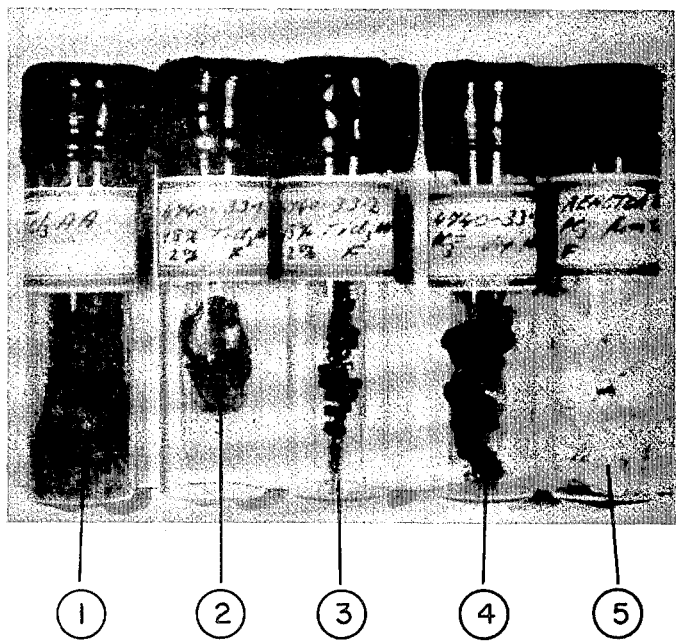
MECHANICAL SHAPING OF
HETEROGENEOUS CATALYST
① — $TiCl_3 \cdot 0.33 AlCl_3$
② — $TiCl_3 \cdot 0.33 AlCl_3 + 2$ Wt. % PTFE
(mat) 40 x 20 x 4 mm
③ — $TiCl_3 \cdot 0.33 AlCl_3 + 2$ Wt. % PTFE
(pellets) 1.8 x 2 mm
④ — POLYPROPYLENE
(from pellets) 7 x 8 mm.
⑤ — POLYPROPYLENE
(alcohol treatment) 7 x 8 mm

SHAPING AND SIZING OF CATALYSTS

This is a continuation of application Ser. No. 811,508, filed June 30, 1977, now abandoned.

BACKGROUND OF THE INVENTION

Catalysts of various sorts, specifically heterogeneous catalysts, usually have a shortcoming: they are difficult to handle. Techniques to modify these catalysts so that they are more easily handled are limited. For example, agglomeration with "binders" is unsuitable since "binders" normally poison the catalyst sites.

Techniques such as sieving the heterogeneous catalysts to remove the catalyst "fines" is a possible technique; however, it is a technique that is expensive. Furthermore, a catalyst manufacturer must then have an outlet for the catalyst "fines" which he accumulates.

Certain heterogeneous catalysts may be sintered with a binder with concomitant loss of catalyst sites. The sintered material may then be extruded or fractured to yield a large heterogeneous catalyst. The problem with this procedure is that it is not applicable to all heterogeneous catalysts, and in some cases damages the catalyst.

With certain catalysts such as olefin polymerization catalysts, the growth of the catalyst itself from the original catalyst seeds can be controlled to yield products having a coarse structure (20 microns or larger) which makes these catalysts more easily handled. Thus, A. P. Haag and M. Weiner (U.S. Pat. Nos. 3,623,846, issued Nov. 30, 1971, assigned to Dart Industries, Inc.) described a process for controlling particle size during condensation and/or desublimation of a material such as titanium trichloride which may be used in the polymerization of alpha-olefins.

In another example as described in British Pat. No. 1,139,450, assigned to Shell Internationale Research Maatschappij, $TiCl_3$ catalysts are formed by controlled reduction of titanium tetrachloride with aluminum alkyls. These materials have a narrow particle size distribution, and have an average diameter greater than 15 microns, and therefore are relatively easy to handle.

However, the latter two examples illustrating two techniques for improving the particle size of catalysts, specifically titanium trichloride olefin polymerization catalysts, have certain limitations. Thus, although the catalyst particle size is greater than the 1 micron dimension which is normally available, the 20 micron size still limits the useability of these catalysts. Increase in catalyst growth to yield particles 100 microns or larger is more difficult. Furthermore, control of particle size during catalyst synthesis is a problem unique to every type of catalyst that might be employed. What is desired, therefore, is a technique that is applicable to heterogeneous catalysts in general, a procedure that is easy to employ, and one that can yield catalysts in shapes and sizes most suitable to each process in which the catalyst is to be used.

In U.S. Pat. No. 3,990,993 (assigned to Exxon Research and Engineering Company) a procedure is described whereby olefin polymerization catalysts, i.e. Ziegler $TiCl_3$-$nAlCl_3$, can be mechanically treated with a fibrillatable polytetrafluoroethylene (PTFE) in order to trap the catalyst "fines" in a web of PTFE microscopic febers, thus producing a catalyst of larger particle size having a more narrow particle-size distribution. Nevertheless, the catalyst is still limited in size obtainable and in particle size distribution by the randomizing technique of fracturing the catalyst-PTFE mixture.

Further, as an expression of the prior art, U.S. Pat. No. 3,051,662 (assigned to Phillips Petroleum Company) describes the use of polyolefins as binders and lubricants for shaping solid materials. The disclosure teaches the formation of simple mixtures which are extruded through a die. In some instances where metal oxide catalysts are involved, the lubricant-binder of the invention is removed, usually by incineration or vaporization. This would destroy the activity of many catalysts. PTFE is only casually mentioned, and the disclosure fails completely to recognize the importance of the invention as disclosed and claimed herein. While it is pointed out that the patentee is concerned with the particle size range of various catalytic materials and the desirability to form these materials into large, uniform, easily handled shapes, U.S. Pat. No. 3,990,993 clearly expresses concern for fines resulting from ballmilling of polyolefin catalysts. Such concern is unnecessary in the practice of this invention.

Further, U.S. Pat. Nos. 3,838,062, 3,838,092, and 3,993,584 disclose the use of a fibrillatable PTFE to create a weak agglomerate of dusts, particularly toxic dusts.

SUMMARY OF THE INVENTION

Particles of catalyst used in heterogeneous reactions are mixed with a fibrillatable polymer, and mechanically sheared to form a coherent mat having the catalyst particles entrapped in the fibers of the polymer. The mat is mechanically shaped, either by rolling and cutting, extrusion, or by some other known method, to produce a catalyst of uniform size and shape which is easily handled and which has lost none of its activity as a result of the mechanical work.

The practice of this invention is particularly suited to the sizing and shaping of Ziegler-type catalysts for the production of polyolefins. In practicing this invention, it becomes possible for those skilled in the art to produce finished pellets of polypropylene directly in the polymer-forming reaction by using the known polymerization conditions and the shaped catalyst materials.

DESCRIPTION OF THE DRAWING

The drawing attached hereto is a photographic reproduction showing material resulting from the steps of the practice of this invention from improvement of a preferred Ziegler-type catalyst through the various steps to the finished polypropylene polymer.

DETAILED DESCRIPTION OF THE INVENTION

It has been discovered that heterogeneous solid catalyst particles can be mechanically worked into large mats or agglomerates of materials and can be subsequently shaped into briquets, pellets, tablets, or other forms. Heterogeneous catalysts of the type described by Marshall Sittig ("Catalysts Manufacture, Recovery and Use", 1972, Noyes Data Corporation, Parkridge, N.J. 07656) in his Chemical Process Review 66 illustrate the various types of heterogeneous catalysts that are used. Thus, oxidation, hydrogenation, hydration, isoforming, isomerization, dehydrogenation, halogenation, polymerization, desulfurization catalysts are just examples of some of the catalysts which can be treated in the practice of this invention. It has been found that even catalysts highly susceptible to poisoning by foreign materials such as Ziegler-type olefin polymerization catalyst, for example, respond favorably to treatment by this method without loss in catalytic activity.

The invention described herein can well be illustrated with the use of olefin polymerization catalysts, specifically $TiCl_3$ catalysts; however, it is understood that the principles illustrated with respect to this catalyst also apply to the other heterogeneous catalysts described by M. Sittig, supra, since the principle of controlling the shape of a heterogeneous catalyst applies, independent of the nature of the catalyst.

It is known that, for example, Ziegler-type $TiCl_3$ catalysts which are normally used in the production of polyolefins, are in a very fine subdivided form where the particles normally have a particle size distribution of 0.1–100 microns. The fine particle size plus the wide particle distribution makes this catalyst difficult to handle, and this catalyst in a liquid medium becomes a sludge which is also difficult to resuspend once the catalyst has settled. Bottle No. 1 in the Drawing illustrates the condition of active $TiCl_3AA$ (reduced with an aluminum alkyl and ball-milled) catalyst particles before the practice of this invention.

It has been found that if the catalyst particles are machanically treated with a small amount of fibrillatable polyolefin, particularly a fibrillatable polytetrafluoroethylene (PTFE), the catalyst is matted with the polyolefin and becomes a large cake of material having the catalyst particles entrapped in the fibrous network of the polyolefin. This cake will subsequently be referred to herein as a "mat". It has been observed that the catalyst sites are affected only to a negligible degree, and that the activity of the catalyst is unimpaired. This mat, which is malleable, can be subsequently shaped to any convenient shape, depending on the type of end use that is desired. The mat can be forced through a circular die at room temperature or higher temperature to yield a strand of material which, upon cutting, yields pellets of catalysts. On the other hand, the matted catalyst-agglomerate may be stamped with a sharp conical instrument, or pressed into molds to yield tablets of material. Surprising, the active sites on the catalyst particles are not obscured by this shaping.

The techniques used to shape the catalyst mat into specific forms are well-known to those skilled in the art, and are partially summarized by G. E. Browning: "Agglomeration", *Chemical Engineering*, Dec. 4, 1967, pp. 147–170. This publication describes the shaping of matted materials with, for example, single punch press, rotary press, layer press, molding press, smooth-roll type press, briquetters or granulators, smooth or corrugated roll type press, pellet mills, and the like, which can be used forming spheroidal or tablet-like particles.

In the practice of this invention, a mixture of the solid catalyst particles and the fibrillatable polyolefin is made such that the polyolefin is present in an amount from about 0.01 wt.% to about 5 wt.% of the mix and, preferably, from about 0.5 wt.% to 2 wt.%. Even though greater amounts than 5 wt.% can be used, there is some risk involved to the active sites of the catalysts which, under the practice of the present invention, even in the case when the Ziegler-type catalyst is being used, remain remarkably active.

With respect to the polyolefins useful in the practice of the invention, it is necessary that it be a fibrillatable polyolefin. A fibrillatable polyolefin is one which, on being subjected to shearing stresses, forms a fibrous network of small fibers, often microscopically sized fibers, which entrap the solid catalyst particles. Examples of the suitable fibrillatable polyolefins are certain ethylenepropylene co-polymers and certain polytetrafluoroethylenes (PTFE). Of the latter, there are two types. One is a colloidial aqueous dispersion concentrated to about 60% by weight of polymer, having particles about 0.05 to about 0.5 microns in size, with average diameters of about 0.02 microns. This aqueous dispersion, of course, could be used in the instance where the solid catalytic particles are insensitive to the presence of water. Of course, where there is a water sensitivity, such colloidial aqueous dispersion could not be used. In such a case, the PTFE, preferred in the practice of this invention, consists of solid agglomerates with average diameters of 450 microns, made up of primary particles ranging in size from 0.05 to 0.5 microns in diameter. Specific surface areas of PTFE powders are of the order of 10–12 $m^3/g$ with an average apparent powder density of 475 g/liter. The foregoing types of PTFE are more fully described in U.S. Pat. No. 2,559,752. While other fibrillatable polyolefins are useful in the practice of this invention, the PTFE, sold as Teflon K by the DuPont Company, is preferred.

Where the PTFE is the polyolefin of choice, the light powder known as Teflon K, Type 10, is worked at a temperature of from about 20° C. to about 120° C., and preferably, of course, at ambient conditions. The common working temperature in order to produce a fibrous mat, is about 100° C. or below.

Once mixed, the catalyst particles and the polyolefin are mechanically sheared, such that the polyolefin becomes fibrillated and the catalyst particles entrapped in a fibrous network of polyolefin. This shearing action is done mechanically in any one of a number of well-known commercially available pieces of equipment such as a ball mill, pugg mill, blender, or the like. This mechanical shearing is performed for from about one to about sixty minutes, with the preferable period from five to about forty minutes and most preferably, from ten to about twenty-five minutes. Of course, longer times can be used, but serve no useful purpose once the shapable fibrous mat is formed. Such a mat is easily recognized, and one such mat is shown in bottle No. 2 of the drawing. The mixing time, of course, is dependent upon the temperature of mixing and the concentration of the polyolefin in the mix. When at higher temperatures, the mixing time is reduced, as is the mixing time when a higher concentration of the fibrillatable polyolefins is used. When PTFE is used in the fibrillatable polymer and a Ziegler-type catalyst was being subjected to the practice of this invention, examination of the mat formed under a microscope shows a very fine microscopic web holding the particles of the catalyst. Quite remarkably, even though it is well known that the Ziegler-type catalysts are readily poisoned, the activity of such catalysts was virtually unaffected, even after having been molded in pellets, such as those shown in bottle No. 3 of the drawing.

In the practice of the method of this invention, these shaped catalysts, whether they be in the form of pellets, tablets, or any other shape, can be used in heterogeneous reactions. Particularly in the case where the well known Ziegler-type catalysts are used to make polypropylene or other polyolefins. In running a normal Ziegler-type reaction to make polypropylene under polymerization conditions, pellets of polymer were produced which appeared as shown in bottle No. 4 of the drawing. After an alcohol treatment to remove the catalyst, using known procedures, the finished polypropylene, in the form of uniform, large-sized pellets, was produced and recovered from the reaction system obviating the necessity of separately forming finished polypropylene into a desired shape. Thus, suprisingly, shaped polypropylene can be produced by merely conducting the polymerization of propylene under polymerization conditions, with a Ziegler-type, titanium-containing catalyst which has been shaped in the practice of this invention. In addition to the different catalysts heretofore described as being applicable in the practice of this invention, the $TiCl_3$ catalyst for olefin polymerization which is supported on a salt such as magnesium chloride or sodium chloride, catalysts well known in the art, are also particularly applicable to the practice of this invention. Promoters or modifiers may also be present in catalysts or particles subjected to the treatment of this invention. Catalyst modification techniques are well known to those skilled in the art and the practice of this invention relates to the treatment of the catalyst particle itself and not to the formation of any specific catalyst, even though its practice with Ziegler-type polymerization catalysts and fibrillatable polytetrafluoroethylene is preferred.

A preferred embodiment of this invention is particularly adaptable to the treatment of Ziegler-type titanium-halide catalysts, e.g., catalysts obtained by reduction of the tetrahalide of titanium to a Ti compound with a lower oxidation state, such as $TiCl_3.AlCl_3$ where x ranges between 0.01 to 1.5; $TiCl_m \cdot AlR_NCl_{3-n}$, where x ranges between 0.01 to 1.5, m ranges between 2 to 3.5, n ranges between 0.01 to 3, and R is an organic radical such as an organic hydrocarbon, preferably alkyl having from one to about five combinations, such as $CH_3$, $C_2H_5$, $C_3H_7$, etc., or other organic radical that normally is known as described by Mole and Jeffrey, "Organoaluminium Compounds", Elsevier, (1972); $MX'_m \cdot M'R_nX_{3-n}$ where metals, M, are of groups IIIB, IVB and VB of the periodic table, and M' are elements of groups IA, IIA, IIIA of the periodic table, X and X' are elements of groups VIA and VIIA of the periodic table, and m, x and n vary as described above. It is well known that the compounds induced are mixtures and that the ranges of values of m, x and n herein are average values.

Further, while it is preferred that the mat of fibrillated polyolefin and catalyst particles be formed in the dry state, it is also possible to create the entrapment of the catalytic particles in the presence of an inert diluent such as hydrocarbon, i.e. heptane and the like. Of course, the selection of the hydrocarbon involved would be dependent upon the catalyst and diluents with which particular catalysts are compatible.

This invention is applicable to many catalysts of differing nature. These and other features of the invention will thus be illustrated by the following examples, which are offered for the purpose of illustration and not limitation.

EXAMPLE 1

To a mortar and pestle were added 9.8 gms of $TiCl_3.0.33\ AlCl_3$ known as $TiCl_{3AA}$ obtained from Stauffer Chemical Company. This is a ball-milled catalyst having a broad particle size distribution. To the mortar and pestle were added also 0.2 gms of fibrillatable PTFE (Teflon K). The Teflon K is a white powder, type 10, which is used and sold as a particle control additive. The two materials were mechanically mixed at room temperature with a pestle until the material was in the shape of a mat. The mat was irregular in shape and had various dimensions where in one case the dimension was $40 \times 20 \times 4$ millimeters (Bottle No. 2). A similar type mat can be formed by using a metal container known as a vibramill, having three chrome alloy steel balls, $\frac{3}{8}''$ in diameter, and adding to this container the same amount of catalyst and Teflon K. In this case, the contents of the mill were rapidly shaken for a period of 5 to 30 minutes. Again, a large mat of material was the product.

EXAMPLE 2

A 13 gauge needle, with a blunt end, was forced through the mat prepared in Example 1, and the needle was thereby packed with a column of matted catalyst. The column of catalyst was forced out of the needle and cut with a sharp object yielding pellets which were 1.8 by 2 millimeters in size.

The size dimensions are given for solids in the shape of right cylinders, with a base of diameter "a" and altitude "b". The volume of these right cylinders is given by the standard formula, $V = \pi(a/2)^2 b$. The shapes of the particles obtained in Examples 2-44 are all right cylinders.

EXAMPLE 3

In a manner similar to Example 2, a cork borer with a 7 millimeter diameter hole was forced through the mat prepared in Example 1, and a tablet, 3 millimeters in thickness, was forced out of the cork borer. Table 1 summarizes the results of the mechanical shaping.

TABLE 1
MECHANICAL SHAPING OF $TiCl_3$ CATALYSTS

| Ex. No. | $TiCl_3.0.3AlCl_3$ gms. | PTFE, gms | PTFE, wt % | Catalyst Shape | Catalyst Size, mm |
|---|---|---|---|---|---|
| 1 | 9.8 | 0.2 | 2 | Irregular Mat | $40 \times 20 \times 4$ |
| 2 | 9.8 | 0.2 | 2 | Pellets | $1.8 \times 2$ |
| 3 | 9.8 | 0.2 | 2 | Tablet | $7 \times 3$ |

EXAMPLES 4-8

Catalyst pellets were prepared according to the procedure described in Examples 1-2, using needles having different diameters. As illustrated in Table 2, pellets of different sizes are obtained.

TABLE 2
PELLETS OF $TiCl_3AA$ OLEFIN POLYMERIZATION CATALYST

| Ex. No. | Catalyst gms. | PTFE, gms. | PTFE, wt. % | Needle, Gauge | Dimensions mm a | Dimensions mm b |
|---|---|---|---|---|---|---|
| 4 | 9.9 | 0.1 | 1% | 10 | 2.68 | 2 |
| 5 | 9.9 | 0.1 | 1% | 13 | 1.8 | 2 |
| 6 | 9.9 | 0.1 | 1% | 15 | 1.37 | 2 |
| 7 | 9.9 | 0.1 | 1% | 18 | 0.84 | 2 |
| 8 | 9.9 | 0.1 | 1% | 22 | 0.15 | 2 |

EXAMPLES 9-12

The effect of titanium trichloride concentration on the pelletized catalyst formation is illustrated by Examples 4 and 8-12 where the titanium trichloride concentration was varied from 95 wt% to 99.5 wt%. Conversely, the PTFE concentration varies from 0.5 wt% to 5 wt%. These examples, detailed in Table 3, illustrate that the actual catalyst concentration can be reduced significantly.

TABLE 3
EFFECT OF TiCl₃AA CONCENTRATION ON PELLETIZED CATALYST FORMATION

| Ex. No. | Catalyst gms. | PTFE, gms. | PTFE, wt. % | Needle Guage | Dimensions mm a | Dimensions mm b |
|---|---|---|---|---|---|---|
| 4 | 9.9 | 0.1 | 1% | 10 | 2.68 | 2 |
| 8 | 9.9 | 0.1 | 1% | 22 | 0.15 | 2 |
| 9 | 4.75 | 0.25 | 5% | 10 | 2.68 | 2* |
| 10 | 4.75 | 0.25 | 5% | 22 | 0.15 | 2* |
| 11 | 9.95 | 0.05 | 0.5% | 10 | 2.68 | 2 |
| 12 | 9.95 | 0.05 | 0.5% | 22 | 0.15 | 2 |

*Material cakes more easily.

EXAMPLES 13-17

The effect of Teflon concentration on the matted catalyst formation is illustrated by Examples 13-17 where it was shown that the Teflon concentration can vary from 0.01 wt.% (Example 17) to at least 2 wt.% (Example 13) as shown in Table 4. The catalyst pellets are formed in a manner similar to the technique described in Examples 1 and 2. In each example, a pliable mat was formed.

TABLE 4
EFFECT OF TEFLON CONCENTRATION ON MATTED CATALYST FORMATION

| Ex. No. | TiCl₃ · 0.33ACl₃ gms. | PTFE, gms. | PTFE, wt. % |
|---|---|---|---|
| 13 | 10 | 0.2 | 2 |
| 14 | 10 | 0.1 | 1 |
| 15 | 10 | 0.05 | 0.5 |
| 16 | 10 | 0.0125 | 0.125 |
| 17 | 10 | 0.001 | 0.01 |

EXAMPLES 18-21

Examples 18-21 illustrate that supported olefin polymerization samples may, in a similar manner, be shaped. Thus, supported olefin polymerization catalysts such as TiCl₃ "supported" on MgCl₂ may be shaped in a manner similar to the technique described in Examples 1 and 2. This is illustrated in Table 5.

TABLE 5
PELLETS OF MgCl₂ "SUPPORTED" OLEFIN POLYMERIZATION CATALYSTS

| Ex. No. | Catalyst Material | Catalyst Gms | PTFE Gms | PTFE Wt. % | Needle Guage | Dimensions, mm a | Dimensions, mm b |
|---|---|---|---|---|---|---|---|
| 18 | TiCl₃AA MgCl₂ | 9 0.9 | 0.1 | 1% | 10 | 2.68 | 2 |
| 19 | TiCl₃AA MgCl₂ | 9 0.9 | 0.1 | 1% | 18 | 0.84 | 2 |
| 20 | TiCl₃AA MgCl₂ | 5 4.9 | 0.1 | 1% | 10 | 2.68 | 2 |
| 21 | TiCl₃AA MgCl₂ | 5 4.9 | 0.1 | 1% | 22 | 0.15 | 2 lighter colored |

EXAMPLES 22-25

These catalysts illustrate that pellets and tablets of TiCl₃AA "supported" on sodium chloride, olefin polymerization catalysts, can be prepared according to the technique described in Examples 1-3. Also, after preparing a mat as in Example 1, the matted catalysts can be subsequently shaped by extrusion, briquetting or tableting, as described earlier. Table 6 summarizes this data.

TABLE 6
PELLETS OF NaCl "SUPPORTED" OLEFIN POLYMERIZATION CATALYSTS

| Ex. No. | Catalyst Material | Catalyst Gms | PTFE Gms | PTFE Wt. % | Needle Guage | Dimension, mm a | Dimension, mm b |
|---|---|---|---|---|---|---|---|
| 22 | TiCl₃AA NaCl | 9 0.9 | 0.1 | 1% | 10 | 2.68 | 2 |
| 23 | TiCl₃AA | 9 | 0.1 | 1% | 22 | 0.15 | 2 |
| 24 | TiCl₃AA NaCl | 7 2.9 | 0.1 | 1% | 10 | 2.68 | 2 |
| 25 | TiCl₃AA NaCl | 7 2.9 | 0.1 | 1% | 22 | 0.15 | 2 lighter colored larger crystals |

EXAMPLES 26-29

The catalysts of these examples were prepared according to the technique described in Example 3, and illustrate that tablets of TiCl₃AA-olefin polymerization catalysts can be prepared having various dimensions, where the tablets described in these experiments are as illustrated. The data summarizing the properties of these catalysts is compiled in Table 7.

TABLE 7
TABLETS OF TiCl₃AA OLEFIN POLYMERIZATION CATALYSTS

| Ex. No. | Catalyst gms. | PTFE gms. | PTFE Wt. % | Cork Borer | Dimensions, mm a | Dimensions, mm b |
|---|---|---|---|---|---|---|
| 26 | 9.9 | 0.1 | 1% | No. 1 | 3 | 1 |
| 27 | 9.9 | 0.1 | 1% | No. 6 | 12 | 1 |
| 28 | 9.9 | 0.1 | 1% | No. 1 | 3 | 5 |
| 29 | 9.9 | 0.1 | 1% | No. 6 | 12 | 5 |

EXAMPLES 30-33

Tablets of TiCl₃AA "supported" on MgCl₂, useful as olefin polymerization catalysts, can be prepared according to the technique described in Example 3. These experiments illustrate that catalysts having various concentrations of titanium trichloride on magnesium chloride can be shaped into tablets of various dimensions according to a technique described in Example 3. The data is summarized in Table 8.

TABLE 8
TABLETS OF MgCl₂ "SUPPORTED" TiCl₃ OLEFIN POLYMERIZATION CATALYSTS

| Ex. No. | Catalyst Material | Catalyst gms. | PTFE gms. | PTFE Wt. % | Cork Borer | Dimensions, mm a | Dimensions, mm b |
|---|---|---|---|---|---|---|---|
| 30 | TiCl₃AA MgCl₂ | 5 4.5 | 0.1 | 1% | No. 1 | 3 | 1 |
| 31 | TiCl₃AA MgCl₂ | 5 4.5 | 0.1 | 1% | No. 6 | 12 | 1 |
| 32 | TiCl₃ MgCl₂ | 5 4.5 | 0.1 | 1% | No. 1 | 3 | 5 |
| 33 | TiCl₃ MgCl₂ | 5 4.5 | 0.1 | 1% | No. 6 | 12 | 5 |

EXAMPLES 34-35

In the case of olefin polymerization catalysts, the polyolefin product has a morphology very similar to the catalyst itself. Thus, an added benefit and part of this invention, in addition to the easy handleability of the catalyst, is that the product has a predetermined form that is also easily handled. In the case of catalysts that have been mechanically shaped to a certain form, products, having a similar form, will exhibit additional attractive properties. This phenomena is well illustrated by examples 34 and 35 where, in Example 34, TiCl₃AA catalyst which has not been treated with PTFE was used to polymerize propylene at 65° C. for 2 hours at atmospheric pressure to yield polypropylene powder, irregular in shape, having dimensions of 0.1 by 0.1 millimeter. By contrast, in Example 35, pelletized TiCl₃AA prepared according to Example 2, is used to polymerize propylene to form pellets of polypropylene which, subsequent to polymerization, are then treated with alcohol to remove the catalyst residue.

The total sequence of catalyst and polymer formation is well illustrated in the drawing previously described where in bottle No. 1 TiCl₃AA is seen to be a finely divided powder. This material, which has been ball-milled with 2 wt.% Teflon, is seen in bottle No. 2 to have the shape of an irregular mat. In bottle No. 3, pellets of dimensions 1.8 by 2 millimeters are evident, as a result of "extruding" the mat. Polypropylene pellets, 7 by 8 millimeters, are formed from the catalyst pellets and are shown in bottle No. 4, which, after treatment with alcohol, yield clear white polypropylene pellets which have dimensions 7 by 8 millimeters shown in bottle No. 5. It is understood that catalyst pellets or tablets of different shape or size will form similar products where the polymer product is a replicate of the catalyst. This, to the inventor's knowledge, is the first instance where, in the case of polyolefin catalysts, polyolefin products are formed in a finished shape in the reactor. The data is summarized in Table 9.

TABLE 9

POLYMER FROM SHAPED TiCl₃ CATALYSTS

| Ex. No. | Catalyst | Polypropylene Shape | Typical Particle Dimensions, mm |
|---|---|---|---|
| 34 | TiCl₃AA | Irregular | 0.1 × 0.1 |
| 35 | Pelletized TiCl₃AA | Pellet | 7 × 8 |

EXAMPLES 36–38

Examples 36–38 illustrate that shaped catalyst particles containing additional reagents (promoters) may be prepared by a technique described according to Examples 1–3. Thus, TiCl₃ catalysts containing either ethylaluminum dichloride or aluminum trichloride can be shaped with additional reagents such as iso-pentyl ether and TiCl₄ (Example 36) to TiCl₃ containing ethyl aluminum dichloride can be treated with fibrillating PTFE and normal pentyl ether, according to Example 37; or catalysts containing TiCl₃ and aluminum chloride can be treated with iso-pentyl ether and Teflon to form a mat according to Example 38; or catalysts such as paladium on carbon can be treated with Teflon to form a mat according to Example 39. The data are summarized in Table 10. Once a mat is formed, catalyst shaping is a matter of the mechanical expedient available or the shape desired.

TABLE 10

SHAPED PROMOTED CATALYST PARTICLES

| Ex. No. | Catalyst, (gms) | Additional Reagent, (gms) | PTFE gms | PTFE wt % | Catalyst Shape |
|---|---|---|---|---|---|
| 36 | TiCl₃ . 0.23 AlCl₃ (9) | (i-C₅H₁₁)₂O (1) TiCl₄ (0.4) | 0.2 | 2 | Mat |

TABLE 10-continued

SHAPED PROMOTED CATALYST PARTICLES

| Ex. No. | Catalyst, (gms) | Additional Reagent, (gms) | PTFE gms | PTFE wt % | Catalyst Shape |
|---|---|---|---|---|---|
| 37 | TiCl₃ . 0.1 EtAlCl₂ (9) | (n-C₅H₁₁)₂O (1) | 0.2 | 2 | Mat |
| 38 | TiCl₃ . 0.05 AlCl₃ (9) | (i-C₅H₁₁)₂O (1) | 0.2 | 2 | Mat |

EXAMPLES 39–44

Other materials in particulate form which serve as heterogeneous catalysts to form fibrous web of entrapped catalyst particles are treated according to Examples 1–3. Thus, as illustrated in Table 11, paladium on charcoal, a hydrogenation catalyst, can be formed into a mat (Example 39). So also vanadium trichloride, an isomerization catalyst, or vanadium tri-acetylacetonate can be shaped into a mat (Examples 40 and 41). Other materials such as AlCl₃, an isomerization and polymerization catalyst (Example 42), MgCl₂ (Example 43), and NaCl (Example 44) serve to show broad applicability of the above desired process.

TABLE 11

SHAPED CATALYSTS WITH MISCELLANEOUS MATERIALS

| Example No. | Catalyst, (gms) | PTFE gms. | PTFE Wt. % | Catalyst Shape |
|---|---|---|---|---|
| 39 | Pd (0.23) C (4.33) | 0.2 | 4 | Mat |
| 40 | VCl₃ (5) | 0.1 | 2 | Mat |
| 41 | V(AcAc)₃ (5) | 0.1 | 2 | Mat |
| 42 | AlCl₃ (5) | 0.1 | 2 | Mat |
| 43 | MgCl₂ (4.9) | 0.1 | 2 | Mat |
| 44 | NaCl (4.9) | 0.1 | 2 | Mat |

I claim:

1. A method for forming shaped, solid catalysts which comprises the steps of mixing solid catalyst particles with a fibrillatable polyolefin; mechanically shearing the mixture to form a mat of catalyst particles entrapped in a fibrous network of the polyolefin, and mechanically shaping the mat to a plurality of particles of predetermined shape and size to provide shaped catalyst particles of uniform size.

2. The method according to claim 1 where the fibrillatable polyolefin is an ethylene-propylene copolymer or a polytetrafluoroethylene.

3. The method according to claim 2 where the mixture of solid catalyst particles and fibrillatable polyolefin contains from about 0.01 wt.% to about 5 wt.% of a fibrillatable polytetrafluoroethylene.

4. The method according to claim 1 where the solid catalyst particles are oxidation, hydrogenation, hydration, isoforming, isomerization, hydrogenation, halogenation, polymerization or desulfurization catalysts.

5. The method according to claim 4 where the catalyst particles are hydrogenation, isomerization, or olefin polymerization catalysts.

6. The method according to claim 1 where the concentration of the fibrillatable polyolefin is from 0.01 wt.% to 5 wt.% of the catalyst-polymer mixture.

7. A process according to claim 1 where the catalyst particles and fibrillatable polyolefin are mechanically ground for from about 5 to about 30 minutes until the polymer fibrillates, and the catalyst particles are entrapped in the fibrillated polymer, yielding a mat of the mixture.

8. The method according to claim 1, where the catalyst particles are a titanium halide catalyst.

9. The method according to claim 8 where the titanium halide is a titanium chloride.

10. The method according to claim 9 where the titanium chloride is represented by the formula $TiCl_x$, where x has a value from 2 to 3.5.

11. A method of preparing shaped Ziegler-type, titanium chloride-containing catalysts of uniform size and substantially cylindrical shape, which comprises the steps of mixing a fibrillatable polytetrafluoroethylene powder with catalytically active catalyst particles such that the resulting mixture contains from about 0.01 wt.% to about 5 wt.% of the polytetrafluoroethylene; subjecting the mixture to mechanical shearing forces for a time sufficient to cause a fibrous mat to form entrapping the catalyst particles therein; and thereafter shaping the mat to produce a plurality of shaped active Ziegler-type catalysts.

12. The method according to claim 11 where the Ziegler-type catalyst has the formula $TiCl_3 \cdot xAlCl_3$, where x has an average value of from 0.01 to 1.5; or $TiCl_m \cdot xALR_nCl_{3-n}$, where x has an average value of from 0.01 to 1.5, m has an average value of from 2 to 3.5, n has an average value of from 0.01 to 3, and R is hydrocarbon radical.

* * * * *